United States Patent [19]

Nagaoka

[11] Patent Number: 5,966,245
[45] Date of Patent: Oct. 12, 1999

[54] ZOOM LENS SYSTEM

[75] Inventor: Toshiyuki Nagaoka, Akishima, Japan

[73] Assignee: Olympus Optical Co., Ltd., Tokyo, Japan

[21] Appl. No.: 08/705,203

[22] Filed: Aug. 29, 1996

[30] Foreign Application Priority Data

Aug. 30, 1995 [JP] Japan ................................ 7-243976

[51] Int. Cl.$^6$ ................................................. G02B 15/14
[52] U.S. Cl. ........................................ 359/676; 359/683
[58] Field of Search ................................ 359/676, 683, 359/684, 708

[56] References Cited

U.S. PATENT DOCUMENTS

| 5,202,992 | 4/1993 | Banno et al. | 359/676 |
| 5,241,420 | 8/1993 | Yamanashi | 359/676 |
| 5,299,064 | 3/1994 | Hamano et al. | 359/684 |
| 5,546,230 | 8/1996 | Sato | 359/684 |

FOREIGN PATENT DOCUMENTS

| 4-13109 | 1/1992 | Japan . |
| 460509 | 2/1992 | Japan . |
| 4-78809 | 3/1992 | Japan . |
| 4-301612 | 10/1992 | Japan . |
| 5-224125 | 9/1993 | Japan . |

*Primary Examiner*—Georgia Epps
*Assistant Examiner*—Jordan M. Schwartz
*Attorney, Agent, or Firm*—Pillsbury Madison & Sutro LLP

[57] ABSTRACT

A zoom lens system composed, in order from the object side, of a first lens unit which has a positive refractive power and is kept stationary during a change of a magnification, a second lens unit which has a negative refractive power and is movable for the change of the magnification, a third lens unit which has a positive refractive power and is kept stationary during the change of the magnification, a fourth lens unit which has a positive refractive power and is movable during the change of the magnification, and a fifth lens unit which has a negative refractive power and is kept stationary during the change of the magnification; and using an aspherical surface or aspherical surfaces in the lens units which are kept stationary during the change of the magnification.

50 Claims, 4 Drawing Sheets

ZOOM LENS SYSTEM

BACKGROUND OF THE INVENTION

1. Field of the Invention

The present invention relates to a zoom lens system which is to be used with video cameras and so on.

2. Description of the Prior Art

As solid-state image pickup devices such as CCD's become more minute, higher imaging performance is required for zoom lens systems which are to be used with video cameras. For meeting demands for compactness of the video cameras themselves, on the other hand, it is desired to configure lens systems which are more compact and of lighter weight. It is generally known to use aspherical surfaces as means for obtaining enhanced performance and compacter design of zoom lens systems which are to be used with video cameras. Lens systems disclosed by Japanese Patent Kokai Publication No. Hei 4-301612, for example, are known as conventional examples which use an aspherical surface for configuring a lens system so as to have a high performance and a compact design. This lens system is a zoom lens system which is composed, in order from the object side, of a first positive lens unit, a second negative lens unit, a third positive lens unit, a fourth positive lens unit and a fifth negative lens unit; and moves the second lens unit and the fourth lens unit for changing magnification. However, this conventional example uses the aspherical surface in the fourth lens unit which is movable for changing the magnification, thereby requiring a manufacturing cost which is enhanced due to the aspherical surface requiring strict allowances for manufacturing.

As conventional examples of zoom lens systems which do not use aspherical surfaces in lens units that are movable for changing magnifications, there are known lens systems disclosed by Japanese Patents Kokai Publication No. Hei 4-78809, No. Hei 4-13109 and No. Hei 4-60509. Each of these conventional examples is composed, in order from the object side, of a first positive lens unit, a second negative lens unit, a third positive lens unit, a fourth positive lens unit and a fifth negative lens unit; moves the second lens unit and the fourth lens unit for changing a magnification, and uses an aspherical surface in the third lens unit or the fifth lens unit which is kept stationary during the change of the magnification. However, all of the lens units used in each of the conventional examples have strong refractive powers for configuring the zoom lens system to be compact and produce aberrations in large amounts, whereby the lens system as a whole cannot correct aberrations to favorable levels or exhibit imaging performance high enough to meet the demands posed by the more minute solid-state image pickup devices such as CCD's.

SUMMARY OF THE INVENTION

A primary object of the present invention is to provide a zoom lens system which has a vari-focal ratio on the order of 8 and an F number on the order of 2.0 and can favorably correct aberrations and be easily manufactured.

The zoom lens system according to the present invention is characterized in that it is composed, in order from the object side, of a first lens unit having a positive refractive power, a second lens unit which has a negative refractive power and is moved in both directions along an optical axis for changing a magnification, a third lens unit having a positive refractive power, a fourth lens unit which has a positive refractive power and is moved in both the directions along the optical axis for correcting a deviation of a focal point caused by changing the magnification, and a fifth lens unit having a negative refractive power, that the fourth lens unit which is movable during the change of the magnification is composed only of spherical lens elements, and that the lens system satisfies the following condition (1):

$$-0.85 < f_w/f_2 < -0.25 \qquad (1)$$

wherein the reference symbol $f_w$ represents a focal length of the zoom lens system as a whole and the reference symbol $f_2$ designates a focal length of the second lens unit.

DETAILED DESCRIPTION OF THE PREFERRED EMBODIMENTS

The zoom lens system according to the present invention has a composition illustrated in FIG. 1 through FIG. 4. Concretely, the zoom lens system according to the present invention is characterized in that it is composed, in order from the object side, of a first lens unit G1 having a positive refractive power, a second lens unit G2 which has a negative refractive power and is moved in both directions along an optical axis for changing a magnification, a third lens unit G3 having a positive refractive power, a fourth lens unit G4 which has a positive refractive power and is moved in both the directions along the optical axis for correcting a deviation of a focal point caused by changing the magnification, and a fifth lens unit having a negative refractive power; that the fourth lens unit which is movable during the change of the magnification is composed only of spherical lens elements; and that the lens system satisfies the following condition (1):

$$-0.85 < f_w/f_2 < -0.25 \qquad (1)$$

wherein the reference symbol $f_w$ represents a focal length of the zoom lens system as a whole at a wide position and the reference symbol $f_2$ designates a focal length of the second lens unit G2.

For obtaining a zoom lens system which is compact, has high performance and can be easily manufactured to be used with video cameras, it is desirable to compose the lens system in order from the object side, of a first lens unit G1 having a positive refractive power, a second lens unit G2 which has a negative refractive power and is movable in both directions along an optical axis for changing magnification, a third lens unit G3 having a positive refractive power, a fourth lens unit G4 which has a positive refractive power and is movable for correcting a deviation of an image surface caused by changing the magnification, and a fifth lens unit G5 having a negative refractive power; to configure the second lens unit G2 so as to satisfy the condition (1); and to compose the fourth lens unit G4 only of spherical lens elements.

For configuring the zoom lens system composed of the five lens units as described above more compactly, it is generally conceivale to shorten a moving distance of the second lens unit for changing the magnification by strengthening the refractive power of the second lens unit which contributes most to the change of the magnification or narrow airspaces reserved between the third, fourth and fifth lens units by strengthening refractive powers of these lens units. In the former case where the refractive power of the second lens unit is strengthened, however, this negative lens unit produces aberrations in large amounts, thereby making it impossible to obtain a lens system which has high optical performance.

The zoom lens system according to the present invention will now be described in more detail. For obtaining a compact zoom lens system having high optical performance, the inventor conceived a first composition of the zoom lens system according to the present invention wherein the negative refractive power of the second lens unit is strengthened to such a degree that it does not aggravate aberrations, and a total length of the zoom lens system as a whole is shortened by strengthening the refractive powers of the third and subsequent lens units. The condition (1) defines a range of refractive power to be imparted to the second lens unit within which aberrations can be favorably corrected in the zoom lens system according to the present invention or it can have high optical performance. If the lower limit of −0.85 of the condition (1) is exceeded, the second lens unit will produce aberrations in large amounts, thereby making it difficult to obtain a lens system having high optical performance. If the upper limit of −0.25 of the condition (1) is not reached, in contrast, the second lens unit will undesirably have a weak refractive power and must be moved for a long distance for changing the magnification, thereby making it difficult to obtain a compact lens system.

For the zoom lens system according to the present invention described above, it is desirable to keep the first lens unit, the third lens unit and the fifth lens unit stationary during the change of the magnification.

Further, when refractive powers are strengthened for the third and subsequent lens units which have a total function of a positive lens for imaging a diverging light bundle emerging from the second lens unit, negative spherical aberration, in particular, is produced in a large amount, thereby making it difficult to obtain a lens system having high optical performance. For favorably correcting the negative spherical aberration, it is conceivable to use aspherical surfaces in the third, fourth or fifth lens unit. Spherical aberration can be corrected favorably by using at least one aspherical surface on at least one lens element disposed in the third and subsequent lens units. For obtaining a lens system which has high optical performance and can be easily manufactured in practice like the zoom lens system according to the present invention, it is desirable to use no aspherical surface in the fourth lens unit which is movable for changing the magnification or compose this lens unit only of spherical lens elements, to keep the third lens unit and the fifth lens unit stationary during the change of the magnification and to use at least one aspherical surface on at least one lens element disposed in at least either of these lens units. An aspherical surface generally exhibits a high effect for correcting aberrations but allows optical performance to be remarkably degraded due to an eccentricity thereof. When an aspherical surface is used in a movable lens unit of a zoom lens system, optical performance is influenced not only due to an eccentricity of a shape of the aspherical surface caused at a stage of manufacturing and an eccentricity of an aspherical lens element itself caused at a stage of assembly into a lens barrel but also due to an eccentricity of a lens moving mechanismIt is thus required to impose strict manufacturing allowances on the movable lens unit, thereby remarkably enhancing a manufacturing cost, increasing manufacturing time and aggravating other manufacturing conditions. When at least either the third lens unit or the fifth lens unit is kept stationary during the change of magnification and an aspherical surface is used in this lens unit as in the zoom lens system according to the present invention, it is possible to eliminate the influence due to the eccentricity of a lens moving mechanism, thereby enabling one to loosen manufacturing allowances, lowering manufacturing cost and shortening manufacturing time for the lens system.

Though the fourth lens unit has a function of the so-called compensator which corrects a deviation of the image surface in the zoom lens system according to the present invention (composed of the five lens units) it is possible to use both the fourth lens unit and the fifth lens unit as a compensator which is integrally moved. When the fourth lens unit, having the positive refractive power, is integrated with the fifth lens unit, having the negative refractive power, however, the integrated compensator has a positive refractive power which is weaker than that of the compensator composed only of the fourth lens unit and must be moved for a longer distance, thereby producing a defect of increasing the total length of the zoom lens system. Further, the integration of the fourth lens unit with the fifth lens unit increases the weight of the compensator or the burden imposed on a lens driving mechanism, thereby constituting a cause for an increase of weight of cameras, or an undesirable cause in configuring cameras compactly and such that they are light in weight thereof. In other words, it is more advantageous to compose a lens system not of four lens units, but of five lens units, as in the case of the present invention. This is not only for facilitating manufacturing, but also for configuring cameras compacter and lighter in weight thereof.

Further, the zoom lens system according to the present invention has a second composition that is characterized in that it is composed, as in the first composition, of a first lens unit having a positive refractive power, a second lens unit having a negative refractive power, a third lens unit having a positive refractive power, a fourth lens unit having a positive refractive power and a fifth lens unit having a negative refractive power. The second lens unit is moved for changing a magnification and the fourth lens unit is moved for correcting a deviation of an image surface caused by changing the magnification. The lens system is characterized in that it satisfies the following condition (3):

$$0.05 < f_w/f_1 < 0.22 \tag{3}$$

wherein the reference symbol $f_1$ represents a focal length of the first lens unit.

When the positive refractive power of the first lens unit is strengthened in the zoom lens system according to the present invention for shortening the total length thereof, offaxial aberrations at a wide position and longitudinal chromatic aberration at a tele position are apt to be remarkable. For correcting these aberrations favorably, it is desirable to satisfy the condition (1).

If the upper limit of 0.22 of the condition (3) is exceeded, the first lens unit will have a strong refractive power, whereby it will be difficult to correct longitudinal chromatic aberration, etc. produced by the first lens unit. If the lower limit of 0.05 of the condition (3) is not reached, in contrast, the first lens unit will have a weak refractive power, thereby making it difficult to configure the zoom lens system so as to have a compact composition.

It is also desirable for the zoom lens system that has the second composition to keep the first lens unit, the third lens unit and the fifth lens unit stationary during the change of the magnification.

Alternately, it is desirable to keep the third lens unit or the fifth lens unit stationary during the change of the magnification and use an aspherical surface in this stationary lens unit.

The zoom lens system according to the present invention has a third composition characterized in that it is composed, in order from the object side, of a first lens unit having a positive refractive power, a second lens unit which has a negative refractive power and is moved in both directions along an optical axis for changing a magnification, a third lens unit having a positive refractive power, a fourth lens unit which has a positive refractive power and is moved in both the directions along the optical axis for correcting a deviation of an image surface, and a fifth lens unit having a negative refractive power. The third lens unit is composed of at least one positive lens component and at least one negative lens component. The fourth lens unit is composed only of spherical lens elements: and that the fifth lens unit is composed of a negative meniscus lens component having a concave surface on the image side.

For obtaining a compact zoom lens system which can be easily manufactured, it is desirable to compose the fourth lens unit which is movable for changing the magnification only of spherical lens elements as described above. If an aspherical surface is used in the fourth lens unit, it will undesirably require strict manufacturing allowances, thereby making it difficult to obtain a lens system which has high optical performance and can be easily manufactured.

When an attempt is made to shorten a total length of the zoom lens system by strengthening the refractive powers of the third and subsequent lens units, spherical aberration and longitudinal chromatic aberration produced by the third lens unit, in particular, will have large values. For favorably correcting these aberrations, it is desirable to compose the third lens unit of at least one positive lens element and at least one negative lens element. It is possible to favorably correct the longitudinal chromatic aberration produced by using a positive lens element and a negative lens element. If the third lens unit is composed only of a single positive lens element, it will be difficult to favorably correct the longitudinal chromatic aberration.

Further, it is desirable that the third lens unit is composed of at least one positive lens element and at least one negative lens element which satisfy the following condition (2):

$$\upsilon_p/\upsilon_n > 1.1 \qquad (2)$$

wherein the reference symbol $\upsilon_p$ represents an Abbe's number of the positive lens element used in the third lens unit and the reference symbol $\upsilon_n$ designates an Abbe's number of the negative lens element used in the third lens unit.

When the condition (2) is satisfied, it is possible to favorably correct the longitudinal chromatic aberration produced by the third lens unit. If the condition (3) is not satisfied, the third lens unit will undesirably under-correct longitudinal chromatic aberration.

Further, it is desirable also for the zoom lens system according to the present invention which has the third composition to keep the first lens unit, the third lens unit and the fifth lens unit stationary during the change of the magnification. Alternately, it is desirable to keep the third lens unit or the fourth lens unit stationary during the change of the magnification and use an aspherical surface in this stationary lens unit.

For the zoom lens system according to the present invention which has the first composition, it is desirable to configure it so as to satisfy not only the condition (1) but also the condition (2).

For the zoom lens system according to the present invention which has the second composition, it is desirable to configure it so as to satisfy not only the condition (3) but also the condition (1) and/or the condition (2).

In the zoom lens system according to the present invention, which has the composition described above (any one of the first through third compositions), coma having a large value is apt to be produced by the fourth lens unit or the fifth lens unit disposed close to the image surface on which offaxial rays are relatively high. For favorably correcting coma in the zoom lens system according to the present invention, the fifth lens unit is composed of a single meniscus lens component which has a concave surface on the image side so as to reduce a value of coma produced by the fifth lens unit and an aspherical surface is used on this lens component for correcting coma produced by the fourth lens unit. Though it is possible to use an aspherical surface in the fourth lens unit when only correction of aberrations is taken into consideration, it is desirable to keep the fifth lens unit stationary during the change of the magnification and use an aspherical lens element in this stationary lens unit for loosening manufacturing allowances for the lens system as described above.

When an aspherical surface is to be used in the third lens unit or the fifth lens unit of the zoom lens system according to the present invention, which has the composition described above (any one of the first through third compositions), it is desirable that at least one of the aspherical surfaces has a shape which weakens a positive refractive power or strengthens a negative refractive power as portions of the aspherical surface are farther from the optical axis toward a marginal portion. Since the second and subsequent lens units in particular which have a total strong positive refractive power tend to produce a negative spherical aberration in a large amount, it is necessary for correcting the negative spherical aberration with an aspherical surface to configure it so as to have a shape which weakens the positive refractive power. If an aspherical surface has a shape which strengthens a positive refractive power as portions of the aspherical surface are farther from the optical axis, it will undesirably aggravate the negative spherical aberration.

Further, it is desirable for favorably correcting aberrations that the zoom lens system according to the present invention (having any one of the first through third compositions) satisfies the condition (1). For more favorable correction of Petzval's sum and distortion, in particular, it is desirable to satisfy, in place of the condition (1), the following condition (1-1):

$$-0.65 < f_w/f_2 < -0.35 \qquad (1\text{-}1)$$

If the upper limit of $-0.35$ of the condition (1-1) is exceeded, the second lens unit will have too weak a negative refractive power, thereby making it difficult to configure the zoom lens system to be compact. If the lower limit of $-0.65$ of the condition (1-1) is not reached, the second lens unit will produce a negative Petzval's sum in a large amount, thereby undesirably tilting an image surface in a direction farther from an object to be photographed and aggravating barrel form distortion.

For obtaining high imaging performance of the zoom lens system according to the present invention having the composition described above (any one of the first through third compositions), it is desired to favorably correct longitudinal chromatic aberration produced by the third lens unit. For this purpose, it is desirable to satisfy the condition (2). For obtaining a high vari-focal ratio exceeding 3, however, it is desirable to satisfy, in place of the condition (2), the following condition (2-1).

$$\nu_p/\nu_n > 1.3 \tag{2-1}$$

When the condition (2-1) is satisfied, it is possible to obtain high imaging performance by correcting longitudinal chromatic aberration produced by the third lens unit. If the condition (2-1) is not satisfied, the third lens unit will undesirably undercorrect longitudinal chromatic aberration.

If the refractive power of the first lens unit is strengthened too much for configuring the zoom lens system according to the present invention compactly, it will be difficult to correct lateral chromatic aberration produced at the wide position in particular. Though this aberration can be corrected to a certain degree by configuring the lens system so as to satisfy the condition (3), it is necessary to correct it more favorably when it is desired to increase the focal length of the lens system toward the wide position. When the zoom lens system according to the present invention is to have a field angle 2ω=40° or wider at the wide position, it is desirable to satisfy, in place of the condition (3), the following condition (3-1):

$$0.07 < f_w/f_1 < 0.16 \tag{3-1}$$

When the condition (3-1) is satisfied, it is possible to favorably correct lateral chromatic aberration produced by the first lens unit. If the upper limit of 0.16 of the condition (3-1) is exceeded, the first lens unit will have too strong a refractive power, thereby making it difficult to favorably correct lateral chromatic aberration produced by the first lens unit. If the lower limit of 0.07 of the condition (3-1) is not reached, the first lens unit will have too weak a refractive power, thereby undesirably making it difficult to shorten the total length of the zoom lens system as a whole.

For loosening manufacturing allowances imposed on the zoom lens system according to the present invention (having any one of the first through third compositions) so that it can easily be manufactured in practice, it is desirable that not only the fourth lens unit which is movable for changing the magnification but also the second lens unit which is moved during the change of the magnification is composed only of homogenous spherical lens elements.

Further, negative spherical aberration, in particular, is apt to be produced in a large amount by the third lens unit on which a diverging light bundle from the second lens unit is incident. For correcting this aberration, it is desirable to satisfy the following condition (4):

$$0.08 < f_w/f_3 < 0.2 \tag{4}$$

wherein the reference symbol $f_3$ represents a focal length of the third lens unit.

If the upper limit of 0.2 of the condition (4) is exceeded, the third lens unit will have too strong a refractive power, thereby undesirably making it difficult to favorably correct negative spherical aberration. If the lower limit of 0.08 of the condition (4) is not reached, in contrast, the third lens unit will have too weak a refractive power, thereby undesirably making it difficult to shorten the total length of the zoom lens system as a whole.

Furthermore, the fourth lens unit has a relatively strong positive refractive power since it has a function to image the light bundle emerging from the third lens unit and tends to produce coma in a large amount since offaxial rays are relatively high on the fourth lens unit. For correcting coma, it is desirable to configure the fourth lens unit so as to satisfy the following condition (5):

$$3.2 < f_t/f_4 < 5.0 \tag{5}$$

wherein the reference symbol $f_4$ represents a focal length of the fourth lens unit and the reference symbol $f_t$ designates a focal length of the zoom lens system as a whole at the tele position.

If the upper limit of 5.0 of the condition (5) is not reached, the fourth lens unit will have too strong a refractive power, thereby undesirably making it difficult to favorably correct coma. If the lower limit of 3.2 of the condition (5) is exceeded, in contrast, the fourth lens unit will have too weak a refractive power, thereby undesirably making it difficult to shorten the total length of the zoom lens system as a whole.

The zoom lens system according to the present invention produces a Petzval's sum in the positive direction and tends to tilt an image surface toward the object side since the third and subsequent lens units have a total positive refractive power which is strengthened for shortening the total length of the lens system as a whole and the second lens unit has the negative refractive power which is not so strong. The Petzval's sum and tilting of the image surface are corrected by composing the fifth lens unit of a single negative lens element and configuring this lens unit so as to satisfy the following condition (6):

$$-5.0 < f_t/f_5 < -1.0 \tag{6}$$

wherein the reference symbol $f_5$ represents a focal length of the fifth lens unit.

If the upper limit of −1.0 of the condition (6) is exceeded, the fifth lens unit will have a weak refractive power, thereby making it difficult to favorably correct the Petzval's sum. If the lower limit of −5.0 of the condition (6) is exceeded, in contrast, the fifth lens unit will have too strong a refractive power, whereby the Petzval's sum will undesirably be overcorrected.

Moreover, it is desirable that the zoom lens system according to the present invention (having any one of the first through third compositions) is focused by moving the fourth lens unit along the optical axis.

Now description will be made of the preferred embodiments of the zoom lens system according to the present invention. Listed below is numerical data selected for the embodiments of the zoom lens system according to the present invention Embodiment 1 f = 8.97~25.03~72.00, F/2.0~2.0~2.0,
2ω = 50.6°~17.8°~6.2°

| | | | |
|---|---|---|---|
| $r_1 = 77.1073$ | | | |
| | $d_1 = 1.8000$ | $n_1 = 1.85504$ | $\nu_1 = 23.78$ |
| $r_2 = 48.6092$ | | | |
| | $d_2 = 5.4000$ | $n_2 = 1.62032$ | $\nu_2 = 63.39$ |
| $r_3 = -550.6664$ | | | |
| | $d_3 = 0.1000$ | | |
| $r_4 = 45.2570$ | | | |
| | $d_4 = 3.8000$ | $n_3 = 1.45720$ | $\nu_3 = 90.31$ |
| $r_5 = 131.6894$ | | | |
| | $d_5 = D1$ (variable) | | |
| $r_6 = 529.1017$ | | | |
| | $d_6 = 1.0000$ | $n_4 = 1.62032$ | $\nu_4 = 63.39$ |
| $r_7 = 14.4314$ | | | |
| | $d_7 = 5.3395$ | | |
| $r_8 = -22.5219$ | | | |
| | $d_8 = 1.0000$ | $n_5 = 1.62032$ | $\nu_5 = 63.39$ |
| $r_9 = 62.6280$ | | | |
| | $d_9 = 0.2000$ | | |
| $r_{10} = 33.9831$ | | | |
| | $d_{10} = 2.0000$ | $n_6 = 1.84281$ | $\nu_6 = 21.00$ |
| $r_{11} = 233.4402$ | | | |
| | $d_{11} = D2$ (variable) | | |

-continued

Embodiment 1

| | | | |
|---|---|---|---|
| $r_{12}$ = stop | | | |
| | $d_{12}$ = 1.1000 | | |
| $r_{13}$ = 23.0027 (aspherical surface) | | | |
| | $d_{13}$ = 5.4399 | $n_7$ = 1.49845 | $\nu_7$ = 81.61 |
| $r_{14}$ = −12.8087 | | | |
| | $d_{14}$ = 1.0000 | $n_8$ = 1.65425 | $\nu_8$ = 58.52 |
| $r_{16}$ = 85.7734 | | | |
| | $d_{16}$ = 3.5883 | $n_9$ = 1.59446 | $\nu_9$ = 68.30 |
| $r_{17}$ = −42.5755 | | | |
| | $d_{17}$ = 0.1000 | | |
| $r_{18}$ = 21.1073 | | | |
| | $d_{18}$ = 1.3831 | $n_{10}$ = 1.81264 | $\nu_{10}$ = 25.43 |
| $r_{19}$ = 10.1527 | | | |
| | $d_{19}$ = 4.0868 | $n_{11}$ = 1.67430 | $\nu_{11}$ = 47.25 |
| $r_{20}$ = −316.4787 | | | |
| | $d_{20}$ = $D_4$ (variable) | | |
| $r_{21}$ = 9.4073 (aspherical surface) | | | |
| | $d_{21}$ = 1.5087 | $n_{12}$ = 1.57366 | $\nu_{12}$ = 50.80 |
| $r_{22}$ = 6.5254 | | | |
| | $d_{22}$ = 3.3484 | | |
| $r_{23}$ = ∞ | | | |
| | $d_{23}$ = 5.0000 | $n_{13}$ = 1.51825 | $\nu_{13}$ = 64.15 |
| $r_{24}$ = ∞ | | | | aspherical surface coefficients (13th surface) P = 1, $A_2$ = 0, $A_4$ = −0.31280 × 10⁻⁴,
$A_6$ = 0.43217 × 10⁻⁷, $A_8$ = 0.23724 × 10⁻⁹
(21th surface) P = 1, $A_2$ = 0, $A_4$ = 0.26769 × 10⁻⁴,
$A^6$ = 0.37020 × 10⁻⁶, $A_8$ = 0.11006 × 10⁻⁷

| | | | |
|---|---|---|---|
| f | 8.97 | 25.03 | 72.00 |
| $D_1$ | 1.500 | 24.957 | 42.069 |
| $D_2$ | 42.566 | 19.116 | 2.000 |
| $D_3$ | 4.703 | 2.891 | 4.795 |
| $D_4$ | 0.306 | 2.132 | 0.229 |

$f_w/f_2$ = −0.547, $\nu_p/\nu_n$ = 1.39, $f_w/f_1$ = 0.125,
$f_w/f_3$ = 0.188, $f_t/f_4$ = 3.412, $f_t/f_5$ = −1.569

| | | | |
|---|---|---|---|
| f | 8.97 | 25.03 | 72.00 |
| $D_1$ | 1.500 | 24.957 | 42.069 |
| $D_2$ | 42.566 | 19.116 | 2.000 |
| $D_3$ | 4.703 | 2.891 | 4.795 |
| $D_4$ | 0.306 | 2.132 | 0.229 |

Embodiment 2 f = 8.13~25.0~80.0, F/2.0~2.0~2.0,
2ω = 56.9°~17.8°~5.5°

| | | | |
|---|---|---|---|
| $r_1$ = 88.2065 | | | |
| | $d_1$ = 1.8000 | $n_1$ = 1.85504 | $\nu_1$ = 23.78 |
| $r_2$ = 59.7838 | | | |
| | $d_2$ = 5.8000 | $n_2$ = 1.57098 | $\nu_2$ 71.30 |
| $r_3$ = −550.2590 | | | |
| | $d_3$ = 0.1000 | | |
| $r_4$ = 56.1090 | | | |
| | $d_4$ = 3.8000 | $n_3$ = 1.45720 | $\nu_3$ = 90.31 |
| $r_5$ = 155.1498 | | | |
| | $d_5$ = D1 (variable) | | |
| $r_6$ = 819.7789 | | | |
| | $d_6$ = 1.0000 | $n_4$ = 1.62032 | $\nu_4$ = 63.39 |
| $r_7$ = 22.0124 | | | |
| | $d_7$ = 6.3499 | | |
| $r_8$ = −29.6409 | | | |
| | $d_8$ = 1.0000 | $n_5$ = 1.69979 | $\nu_5$ = 55.53 |
| $r_9$ = 29.6976 | | | |
| | $d_9$ = 0.2000 | | |
| $r_{10}$ = 29.0354 | | | |
| | $d_{10}$ = 2.0000 | $n_6$ = 1.84281 | $\nu_6$ = 21.00 |
| $r_{11}$ = 146.0070 | | | |
| | $d_{11}$ = $D_2$ (variable) | | |
| $r_{12}$ = stop | | | |
| | $d_{12}$ = 1.1000 | | |

-continued

Embodiment 2

| | | | |
|---|---|---|---|
| $r_{13}$ = 33.5424 (aspherical surface) | | | |
| | $d_{13}$ = 6.9327 | $n_7$ = 1.57098 | $\nu_7$ = 71.30 |
| $r_{14}$ = −14.2380 | | | |
| | $d_{14}$ = 1.0000 | $n_8$ = 1.76651 | $\nu_8$ = 40.10 |
| $r_{15}$ = −43.0482 | | | |
| | $d_{15}$ = $D_3$ (variable) | | |
| $r_{16}$ = 31.0185 | | | |
| | $d_{16}$ = 5.1700 | $n_9$ = 1.57098 | $\nu_9$ = 71.30 |
| $r_{17}$ = −45.9716 | | | |
| | $d_{17}$ = 0.1000 | | |
| $r_{18}$ = 15.5957 | | | |
| | $d_{18}$ = 1.0000 | $n_{10}$ = 1.88814 | $\nu_{10}$ = 40.78 |
| $r_{19}$ = 10.1763 | | | |
| | $d_{19}$ = 4.5724 | $n_{11}$ = 1.60520 | $\nu_{11}$ = 65.48 |
| $r_{20}$ = −18506.0000 | | | |
| | $d_{20}$ = $D_4$ (variable) | | |
| $r_{21}$ = 10.7535 (aspherical surface) | | | |
| | $d_{21}$ = 1.2335 | $n_{12}$ = 1.88814 | $\nu_{12}$ = 40.78 |
| $r_{22}$ = 6.3488 | | | |
| | $d_{22}$ = 7.3568 | | |
| $r_{23}$ = ∞ | | | |
| | $d_{23}$ = 5.0000 | $n_{13}$ = 1.51825 | $\nu_{13}$ = 64.15 | aspherical surface coefficients (13th surface) P = 1, $A_2$ = 0, $A_4$ = −0.38676 × 10⁻⁴,
$A_6$ = 0.16576 × 10⁻⁷, $A_8$ = −0.40075 × 10⁻¹⁰
(21th surface) P = 1, $A_2$ = 0, $A_4$ = 0.14712 × 10⁻¹⁴,
$A^6$ = 0.16441 × 10⁻⁶, $A_8$ = −0.19954 × 10⁻⁹

| | | | |
|---|---|---|---|
| f | 8.13 | 25.0 | 80.0 |
| $D_1$ | 1.500 | 33.071 | 54.549 |
| $D_2$ | 55.052 | 23.480 | 2.000 |
| $D_3$ | 2.707 | 1.397 | 1.977 |
| $D_4$ | 0.100 | 1.416 | 0.844 |

$f_w/f_2$ = −0.451, $\nu_p/\nu_n$ = 1.78, $f_w/f_1$ = 0.091
$f_w/f_3$ = 0.169, $f_t/f_4$ = 4.685, $f_t/f_5$ = −3.980

Embodiment 3 f = 7.52~20.0~60.0, F/2.0~2.0~2.0,
2ω = 59.1°~22.0°~7.3°

| | | | |
|---|---|---|---|
| $r_1$ = 137.6711 | | | |
| | $d_1$ = 1.8000 | $n_1$ = 1.84281 | $\nu_1$ = 21.00 |
| $r_2$ = 66.4571 | | | |
| | $d_2$ = 5.6000 | $n_2$ = 1.57098 | $\nu_2$ = 71.30 |
| $r_3$ = −271.6983 | | | |
| | $d_3$ = 0.1000 | | |
| $r_4$ = 48.4907 | | | |
| | $d_4$ = 4.0000 | $n_3$ = 1.75844 | $\nu_3$ = 52.33 |
| $r_5$ = 131.0602 | | | |
| | $d_5$ = D1 (variable) | | |
| $r_6$ = 126.7542 | | | |
| | $d_6$ = 1.0000 | $n_4$ = 1.62032 | $\nu_4$ = 63.39 |
| $r_7$ = 15.7517 | | | |
| | $d_7$ = 6.9076 | | |
| $r_8$ = −49.1898 | | | |
| | $d_8$ = 1.0000 | $n_5$ = 1.57098 | $\nu_5$ = 71.30 |
| $r_9$ = 49.7962 | | | |
| | $d_9$ = 0.2000 | | |
| $r_{10}$ = 25.1187 | | | |
| | $d_{10}$ = 2.0000 | $n_6$ = 1.85504 | $\nu_6$ = 23.78 |
| $r_{11}$ = 92.7708 | | | |
| | $d_{11}$ = 2.9512 | | |
| $r_{12}$ = −31.6994 | | | |
| | $d_{12}$ = 2.0000 | $n_7$ = 1.62032 | $\nu_7$ = 63.39 |
| $r_{13}$ = 85.3332 | | | |
| | $d_{13}$ = $D_2$ (variable) | | |
| $r_{14}$ = stop | | | |
| | $d_{14}$ = 1.1000 | | |
| $r_{15}$ = 22.2995 (aspherical surface) | | | |
| | $d_{15}$ = 4.1553 | $n_8$ = 1.57098 | $\nu_8$ = 71.30 |
| $r_{16}$ = −20.1628 (aspherical surface) | | | |
| | $d_{16}$ = 1.0629 | | |
| $r_{17}$ = −15.8936 | | | |
| | $d_{17}$ = 1.0000 | $n_9$ = 1.82017 | $\nu_9$ = 46.62 |
| $r_{18}$ = −79.7583 | | | |

-continued

Embodiment 3

$r_{19} = 62.6218$
$d_{18} = D_3$ (variable)
$d_{19} = 3.7459$    $n_{10} = 1.82017$    $\nu_{10} = 46.62$
$r_{20} = -31.3011$
$d_{20} = 0.1000$
$r_{21} = 18.4299$
$d_{21} = 1.0000$    $n_{11} = 1.81264$    $\nu_{11} = 25.43$
$r_{22} = 10.3448$
$d_{22} = 4.9146$    $n_{12} = 1.62032$    $\nu_{12} = 63.39$
$r_{23} = -169.8183$
$d_{23} = D_4$ (variable)
$r_{24} = 9.5808$ (aspherical surface)
$d_{24} = 1.4502$    $n_{13} = 1.69417$    $\nu_{13} = 31.08$
$r_{25} = 6.0393$
$d_{25} = 5.3543$
$r_{26} = \infty$
$d_{26} = 5.0000$    $n_{14} = 1.51825$    $\nu_{14} = 64.15$
$r_{27} = \infty$ aspherical surface coefficients (15th surface)   $P = 1$, $A_2 = 0$    $A_4 = -0.45410 \times 10^{-4}$,
                 $A_6 = 0.10984 \times 10^{-7}$,    $A_8 = -0.15415 \times 10^{-8}$
(16th surface)   $P = 0$, $A_2 = 0$,    $A_4 = -0.17051 \times 10^{-4}$,
                 $A^6 = -0.33448 \times 10^{-10}$,    $A_8 = -0.21172 \times 10^{-8}$
(24th surface)   $P = 1$, $A_2 = 0$,    $A_4 = -0.44752 \times 10^{-7}$
                 $A_6 = -0.14270 \times 10^{-7}$,    $A_8 = -0.39118 \times 10^{-8}$

| | | | |
|---|---|---|---|
| f | 7.52 | 20.0 | 60.0 |
| $D_1$ | 1.500 | 22.830 | 39.341 |
| $D_2$ | 39.842 | 18.512 | 2.000 |
| $D_3$ | 3.039 | 1.601 | 1.713 |
| $D_4$ | 0.100 | 1.535 | 1.423 |

$f_w/f_2 = -0.523$, $\nu_p/\nu_n = 1.53$, $f_w/f_1 = 0.106$
$f_w/f_3 = 0.118$, $f_t/f_4 = 4.009$, $f_t/f_5 = -2.122$

Embodiment 4

$f = 8.16 \sim 20.07 \sim 56.0$,    $F/2.8 \sim 2.8 \sim 2.8$
$2\omega = 55.5° \sim 22.2° \sim 7.9°$ $r_1 = 98.8042$
$d_1 = 1.6000$    $n_1 = 1.85504$    $\nu_1 = 23.78$
$r_2 = 54.8396$
$d_2 = 5.5000$    $n_2 = 1.57098$    $\nu_2 = 71.30$
$r_3 = -213.9098$
$d_3 = 0.2000$
$r_4 = 37.2379$
$d_4 = 4.0000$    $n_3 = 1.57098$    $\nu_3 = 71.30$
$r_5 = 95.3887$
$d_5 = D1$ (variable)
$r_6 = 148.7751$
$d_6 = 1.0000$    $n_4 = 1.62032$    $\nu_4 = 63.39$
$r_7 = 15.5841$
$d_7 = 5.6681$
$r_8 = -55.3588$
$d_8 = 1.0000$    $n_5 = 1.59446$    $\nu_5 = 68.30$
$r_9 = 49.9381$
$d_9 = 0.2000$
$r_{10} = 23.8741$
$d_{10} = 2.0000$    $n_6 = 1.85504$    $\nu_6 = 23.78$
$r_{11} = 92.6110$
$d_{11} = 2.9929$
$r_{12} = -27.3377$
$d_{12} = 1.0000$    $n_7 = 1.62032$    $\nu_7 = 63.39$
$r_{13} = 73.8028$
$d_{13} = D_2$ (Variable)
$r_{14}$ = stop
$d_{14} = 1.0000$
$r_{15} = 19.7703$
$d_{15} = 3.8956$    $n_8 = 1.59446$    $\nu_8 = 68.30$
$r_{16} = -23.0023$ (aspherical surface)
$d_{16} = 0.7798$
$r_{17} = -15.3244$
$d_{17} = 1.0000$    $n_9 = 1.83945$    $\nu_9 = 42.72$
$r_{18} = -85.7764$
$d_{18} = D_3$ (Variable)
$r_{19} = 63.9107$ Embodiment 4

$r_{20} = -25.2681$
$d_{19} = 3.3787$    $n_{10} = 1.79196$    $\nu_{10} = 47.38$
$d_{20} = 0.2000$
$r_{21} = 20.3710$
$d_{21} = 3.8509$    $n_{11} = 1.62032$    $\nu_{12} = 63.39$
$r_{22} = -12.0220$
$d_{22} = 1.0000$    $n_{12} = 1.70605$    $\nu_{12} = 30.11$
$r_{23} = -93.5290$
$d_{23} = D_4$ (variable)
$r_{24} = 9.8017$ (aspherical surface)
$d_{24} = 1.8000$    $n_{13} = 1.67158$    $\nu_{13} = 33.04$
$r_{25} = 5.8851$
$d_{25} = 5.1300$
$r_{26} = \infty$
$d_{26} = 5.0000$    $n_{14} = 1.51825$    $\nu_{14} = 64.15$
$r_{27} = \infty$ aspherical surface coefficients (16th surface)   $P = 1$, $A_2 = 0$    $A_4 = 0.43220 \times 10^{-4}$,
                 $A_6 = -0.15285 \times 10^{-7}$,    $A_8 = -0.35514 \times 10^{-8}$
(24th surface)   $P = 1$, $A_2 = 0$,    $A_4 = 0.13948 \times 10^{-8}$
                 $A^6 = -0.18048 \times 10^{-6}$,    $A_8 = 0.11347 \times 10^{-8}$

| | | | |
|---|---|---|---|
| f | 8.16 | 20.07 | 56.0 |
| $D_1$ | 1.500 | 18.955 | 33.529 |
| $D_2$ | 34.022 | 16.570 | 2.000 |
| $D_3$ | 2.545 | 1.301 | 1.662 |
| $D_4$ | 0.200 | 1.436 | 1.065 |

$f_w/f_2 = -0.592$, $\nu_p/\nu_n = 1.60$, $f_w/f_1 = 0.127$
$f_w/f_3 = 0.116$, $f_t/f_4 = 4.061$, $f_t/f_5 = -2.082$

| | | | |
|---|---|---|---|
| f | 8.16 | 20.07 | 56.0 |
| $D_1$ | 1.500 | 18.955 | 33.529 |
| $D_2$ | 34.022 | 16.570 | 2.000 |
| $D_3$ | 2.545 | 1.301 | 1.662 |
| $D_4$ | 0.200 | 1.436 | 1.065 | wherein the reference symbols $r_1$, $r_2$, . . . represent radii of curvature on surfaces of respective lens elements, the reference symbols $d_1$, $d_2$, . . . designate thicknesses of the respective lens elements and airspaces reserved therebetween, the reference symbols $n_1$, $n_2$, . . . denote refractive indices of the respective lens elements for the e-line, and the reference symbols $\nu_1$, $\nu_2$, . . . represent Abbe's numbers of the respective lens elements.

Figure 1:
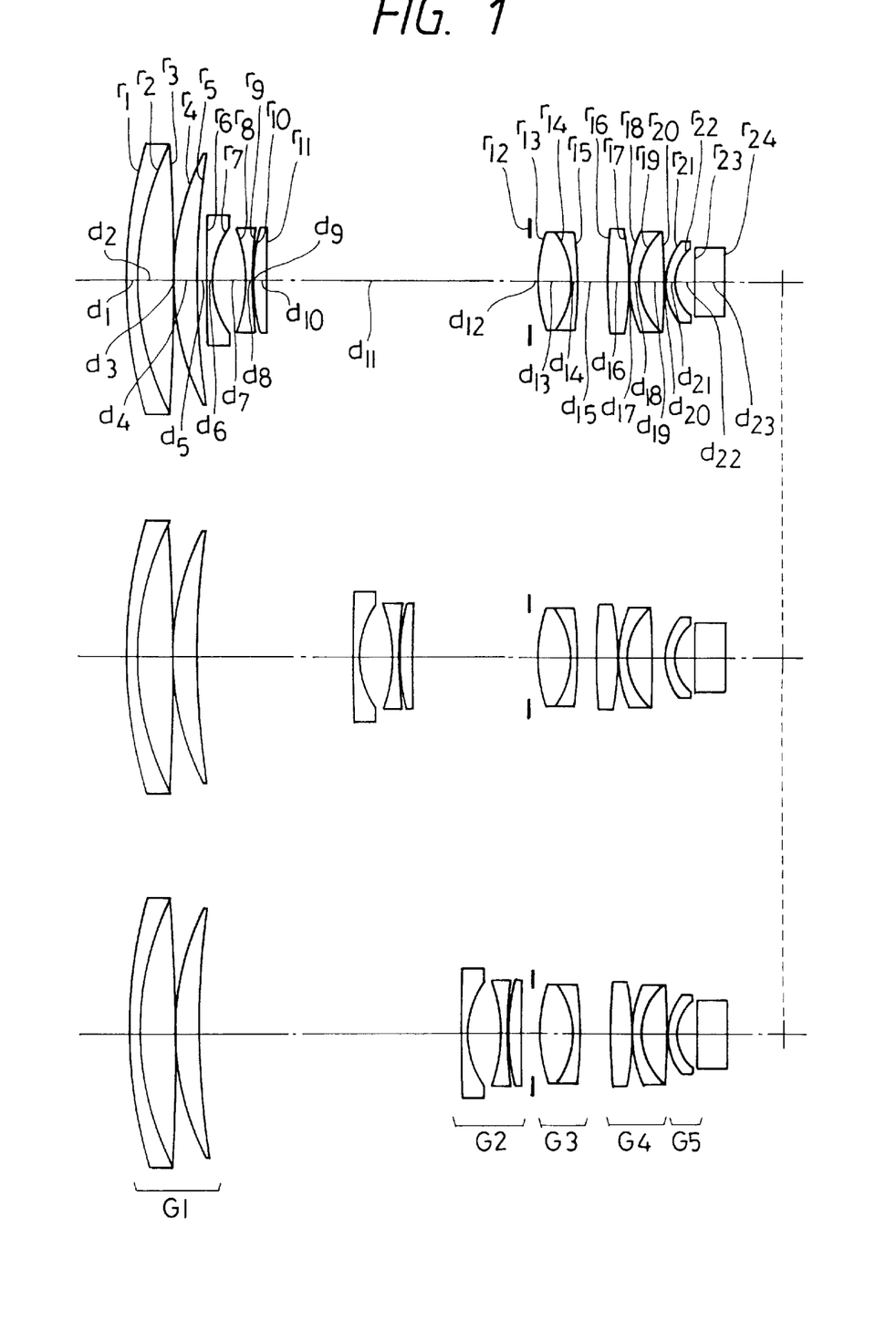
FIG. 1 through FIG. 4 show sectional views illustrating compositions of first through fourth embodiments respectively of the zoom lens system according to the present invention.

Out of the embodiments described above, the first embodiment has a composition illustrated in FIG. 1, or is composed of a first lens unit G1 which is kept stationary during a change of a magnification and has a positive refractive power; a second lens unit G2 which has a negative refractive power and is moved in both directions along an optical axis for changing a magnification, or has a vari-focal function; a third lens unit G3 which is kept stationary during the change of the magnification and has a positive refractive power, a fourth lens unit G4 which has a positive refractive power and is movable during the change of the magnification, or has a function to correct a deviation of an image surface caused by changing the magnification; and a fifth lens unit G5 which has a negative refractive power and is kept stationary during the change of the magnification.

The first lens unit is composed, in order from the object side, of a negative lens element, a positive lens element and a positive lens component; and has a function to narrow a light bundle coming from an axial object point and another function to lead a light bundle emitted from an offaxial object point to the second lens unit G2. The second lens unit G2 is composed, in order from the object side, of a negative lens component, a negative lens component and a positive lens component, and has a vari-focal function or is moved from the object side toward the image side for changing a magnification at a wide position to that at a tele position. The third lens unit G3 consists, in order from the object side, of a positive lens element and a negative lens element, is kept stationary during the change of the magnification, and has a function to transform a diverging light bundle emerging from the second lens unit into a nearly afocal light bundle. The fourth lens unit G4 is composed, in order from the object side, of a positive lens component, a negative lens element and a positive lens element, and is movable during the change of the magnification for correcting a deviation of a focal point caused by changing the magnification. The fifth lens unit G5 is kept stationary during the change of the magnification and is composed of a single negative meniscus lens component having a concave surface on the image side.

Lateral chromatic aberration at the wide position and longitudinal chromatic aberration at a tele position are corrected favorably by using a cemented lens component which is composed of the negative lens element and the positive lens element in the first lens unit G1.

Longitudinal chromatic aberration produced by the third lens unit G3 is corrected favorably with a cemented lens component composed of the positive lens element and the negative lens element disposed in this lens unit.

Further, correction of negative spherical aberration produced by the third lens unit G3 is enabled by using an aspherical surface which weakens a positive refractive power as portions of the aspherical surface are farther from an optical axis is used as an object side surface of the lens element disposed on the object side in the third lens unit G3, which is kept stationary during the change of the magnification. Furthermore, the fourth lens unit G4 is composed only of spherical lens elements for obtaining a composition of the zoom lens system which is advantageous for reducing degradation of optical performance due to eccentricity of the lens unit caused by changing the magnification. Moreover, an object side surface of the fifth lens unit G5 on which offaxial rays are relatively high is configured as an aspherical surface for enabling favorable correction of offaxial aberrations in particular.

The aspherical surfaces used in the embodiments have shapes expressed by the formula shown below:

$$x = \frac{y^2/r}{1 + \sqrt{1 - p(y/r)^2}} + \sum_{i=1}^{n} A_{2i} y^{2i}$$

wherein a direction along the optical axis is taken as the x axis, a direction perpendicular to the optical axis is taken as the y axis, the reference symbol r represents a radius of curvature of a portion of an aspherical surface of interest which is located on the optical axis, the reference symbol $A_{2i}$ designates the aspherical surface coefficient and the reference symbol p denotes a conical constant.

For focusing the zoom lens system preferred as the first embodiment onto an object located at an extremely short distance, it is desirable to move the fourth lens unit G4. Out of the lens units of the zoom lens system according to the present invention, the fourth lens unit G4 is movable for changing the magnification and does not use an aspherical surface for preventing optical performance due to eccentricity. Degradation of the optical performance due to eccentricity can be lowered by selecting the fourth lens unit as a focusing lens unit. This selection eliminates the necessity to use a separate lens driving mechanism and provides an advantage for composing the lens unit compactly and light in weight.

Figure 2:
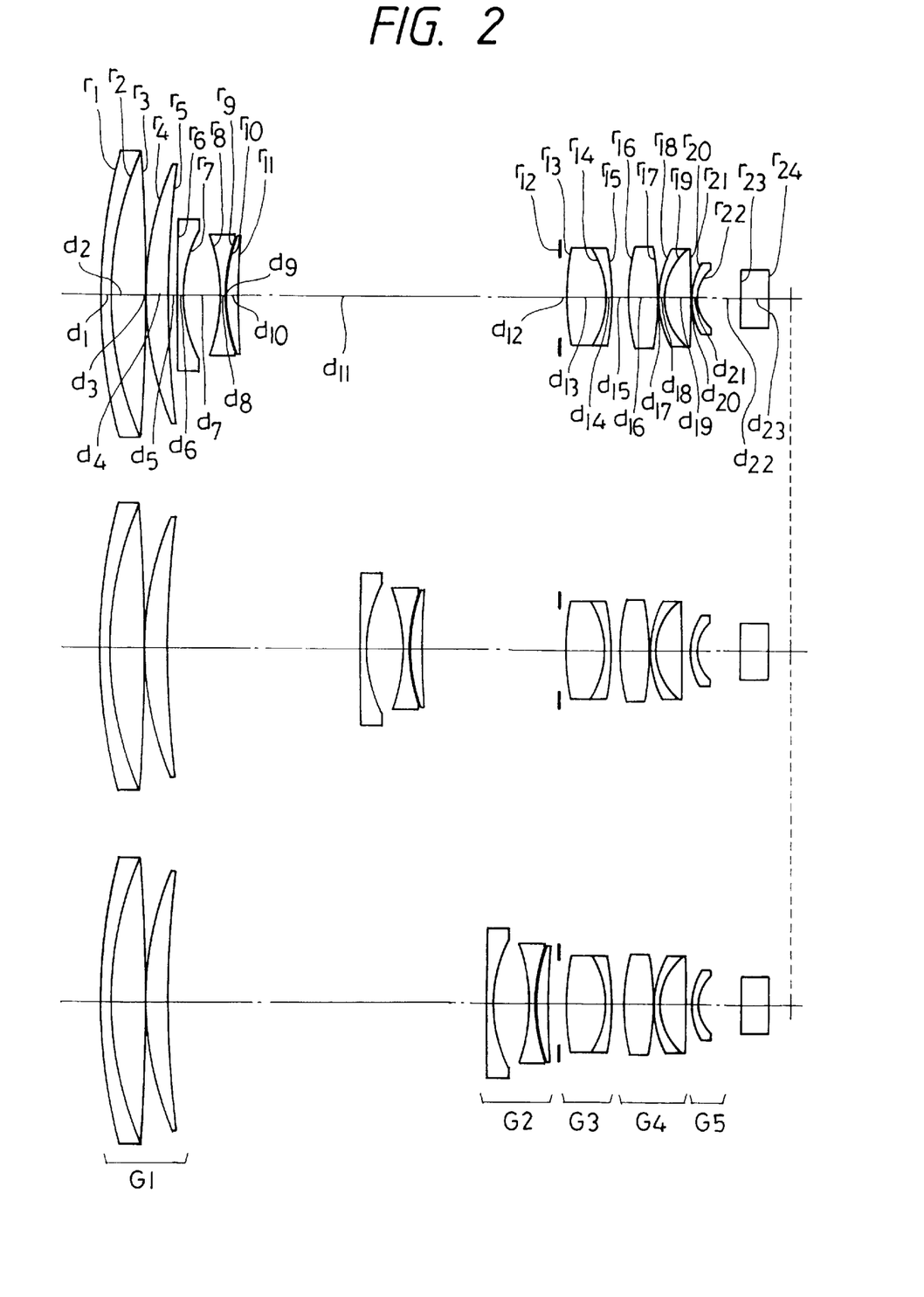

The second embodiment has a composition illustrated in FIG. 2, wherein a zoom lens system is composed, in order from the object side, of a first positive lens unit G1, a second negative lens unit G2, a third positive lens unit G3, a fourth positive lens unit G4 and a fifth negative lens unit G5; the second lens unit G2 and the fourth lens unit G4 are movable for changing a magnification; and the lens units have functions which are substantially the same as those of the lens units used in the first embodiment. The second embodiment, which has a vari-focal ratio of 10, is an example having a vari-focal ratio higher than that of the first embodiment.

The first lens unit G1 is composed, in order from the object side, of a negative lens element, a positive lens element and a positive lens component; the second lens unit G2 is composed, in order from the object side, of a negative lens component, a negative lens component and a positive lens component; the third lens unit G3 is composed, in order from the object side, of a positive lens component and a negative lens component; the fourth lens unit G4 is composed, in order from the object side, of a positive lens component, a negative lens element and a positive lens element; and the fifth lens unit G5 is composed of a negative meniscus lens component which is kept stationary during the change of the magnification and has a concave surface on the image side. Aspherical surfaces are used in the third lens unit G3 and the fifth lens unit G5, which are kept stationary during the change of the magnification.

The second embodiment, which satisfies the conditions specified by the present invention, is capable of favorably correcting aberrations though it has a vari-focal ratio as high as 10.

Figure 3:
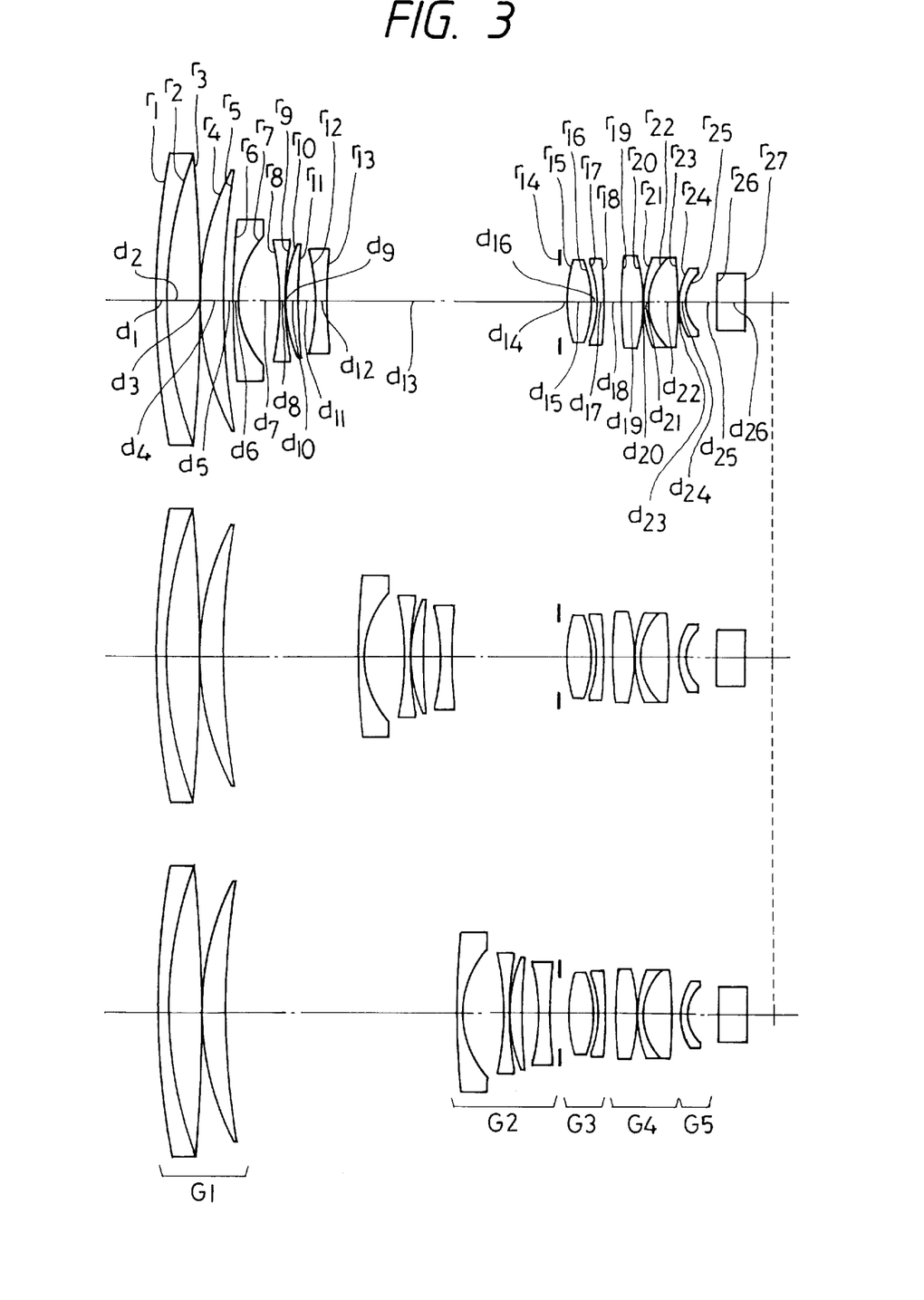

The third embodiment has a composition illustrated in FIG. 3, wherein a zoom lens system is composed, in order from the object side, of a first positive lens unit G1, a second negative lens unit G2, a third positive lens unit G3, a fourth positive lens unit G4 and a fifth negative lens unit G5; the second lens unit G2 and the fourth lens unit G4 are movable for changing a magnification; and the lens units have functions which are substantially the same as those of the lens units used in the first embodiment. The third embodiment is an example of a zoom lens system having a field angle widened by selecting a focal length at the wide position which is shorter than that of the second embodiment.

The first lens unit G1 is composed, in order from the object side, of a negative lens element, a positive lens element and a positive lens component; the second lens unit G2 is composed, in order from the object side, of a negative lens component, a negative lens component, a positive lens component and a negative lens component; the third lens unit G3 is composed, in order from the object side, of a positive lens element and a negative lens element; the fourth lens unit G4 is composed, in order from the object side, of a positive lens component, a negative lens element and a positive lens element; and the fifth lens unit G5 is composed of a single negative meniscus lens component which is kept stationary during the change of the magnification and has a concave surface on the image side. When a focal length of a zoom lens system at a wide position is shortened, negative distortion produced at the wide position in particular poses a problem. In the third embodiment, negative distortion produced by the second lens unit G2 can be corrected favorably by sharing a negative refractive power between the two negative lens components disposed in the second lens unit G2. Aspherical surfaces are used in the third lens unit and the fifth lens unit which are kept stationary during the change of the magnification. Different from the third lens unit of the first embodiment, the third lens unit G3 of the third embodiment comprises the positive lens element and the negative lens element which are not cemented to each other but separated from each other and use aspherical surfaces on both sides for correcting aberrations more favorably.

Figure 4:
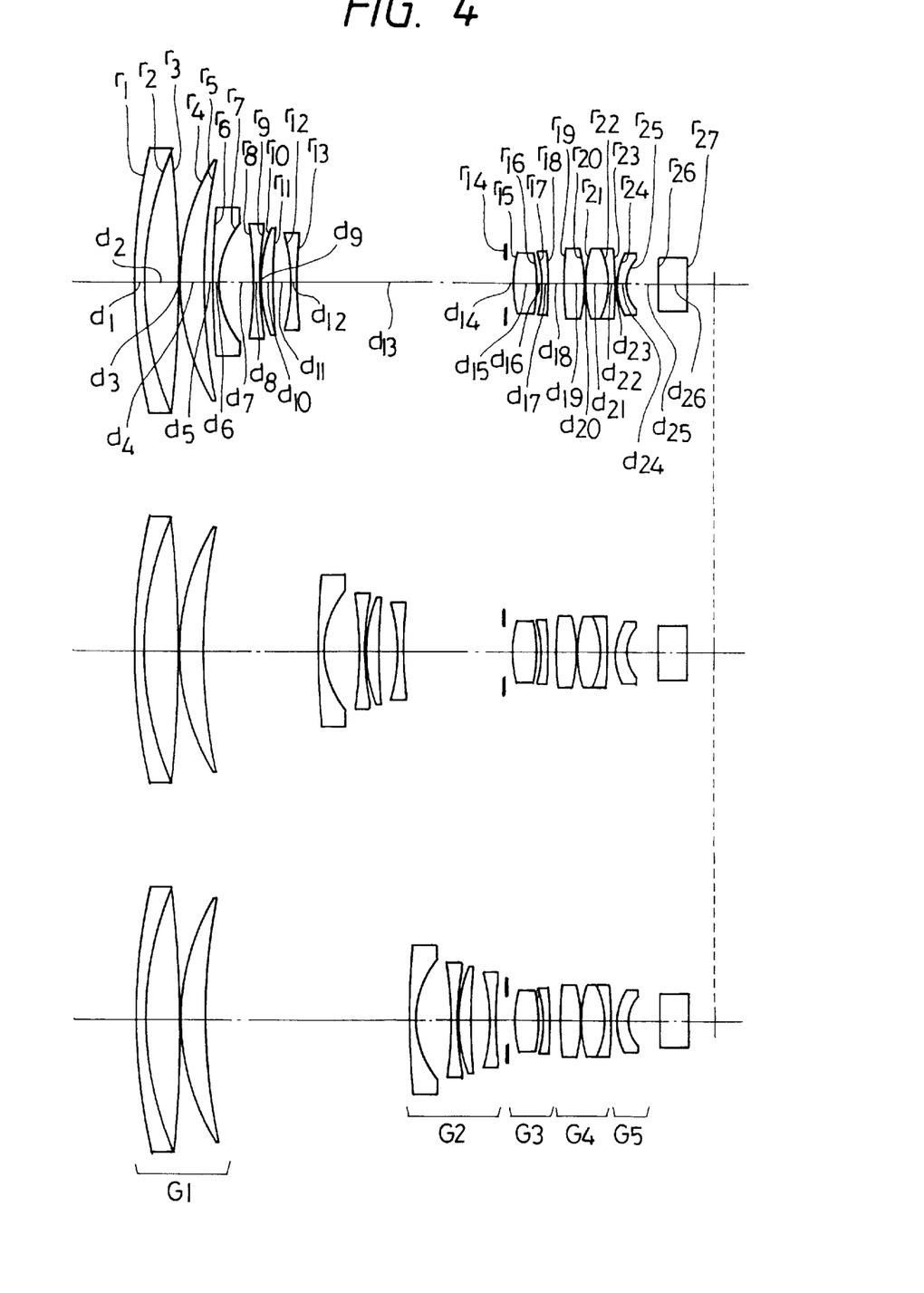

The fourth embodiment has a composition illustrated in FIG. 4 wherein a zoom lens system is composed, in order from the object side, of a first positive lens unit G1, a second negative lens unit G2, a third positive lens unit G3, a fourth positive lens unit G4 and a fifth negative lens unit G5; the second lens unit G2 and the fourth lens unit G4 are movable for changing a magnification; and the lens units have functions which are substantially the same as those of the lens units used in the first embodiment. The fourth embodiment is an example wherein refractive powers of the lens units are strengthened for shortening a total length of a zoom lens system as a whole.

The first lens unit G1 is composed, in order from the object side, of a negative lens element, a positive lens element and a positive lens component; the second lens unit G2 is composed, in order from the object side, of a negative lens component, a negative lens component, positive lens component and a negative lens component; the third lens unit G3 is composed, in order from the object side, of a positive lens element and a negative lens element; the fourth lens unit G4 is composed, in order from the object side, of a positive lens component, a positive lens element and a negative lens element; and the fifth lens unit G5 is composed of a single negative meniscus lens component which is kept stationary during the change of the magnification and has a concave surface on the image side. Aspherical surfaces are used in the third lens unit G3 and the fifth lens unit G5, which are kept stationary during the change of the magnification.

Though aberrations are produced in large amounts in the zoom lens system according to the present invention in which refractive powers of the lens units are strengthened for shortening a total length of the lens system, these aberrations can be corrected favorably by configuring the lens system so as to satisfy the conditions specified by the present invention.

The present invention makes it possible to provide a zoom lens system which is suited for use with video cameras and still video cameras, compact, high in optical performance and can easily be manufactured in practice.

I claim:

1. A zoom lens system comprising, in order from an object side:

a first lens unit having a positive refractive power;
a second lens unit which has a negative refractive power and is moved along an optical axis effecting a change in magnification;
a third lens unit having a positive refractive power;
a fourth lens unit which has a positive refractive power and is moved along the optical axis for correcting a deviation of a focal point caused by changing the magnification; and
a fifth lens unit having a negative refractive power,
wherein said fourth lens unit consists of spherical lens elements and wherein said zoom lens system satisfies condition (1):

$$-0.85 < f_w/f_2 < -0.25 \qquad (1)$$

wherein reference symbol $f_w$ represents a focal length of the zoom lens system as a whole at a wide position and reference symbol $f_2$ designates a focal length of said second lens unit.

2. A zoom lens system comprising, in order from an object side:

a first lens unit having a positive refractive power;
a second lens unit which has a negative refractive power and is moved along an optical axis effecting a change in magnification;
a third lens unit having a positive refractive power;
a fourth lens unit which has a positive refractive power and is moved along the optical axis for correcting a deviation of a focal point caused by changing the magnification; and
a fifth lens unit having a negative refractive power,
wherein said fourth lens unit consists of spherical lens elements and wherein said zoom lens system satisfies condition (3):

$$0.05 < f_w/f_1 < 0.22 \qquad (3)$$

wherein reference symbol $f_w$ represents a focal length of said zoom lens system as a whole at a wide position and reference symbol $f_1$ designates a focal length of said first lens unit.

3. A zoom lens system comprising, in order from an object side:

a first lens unit having a positive refractive power;
a second lens unit which has a negative refractive power and is moved along an optical axis effecting a change in magnification;
a third lens unit having a positive refractive power;
a fourth lens unit which has a positive refractive power and is moved along the optical axis for correcting a deviation of a focal point caused by changing the magnification; and
a fifth lens unit having a negative refractive power,
wherein said third lens unit consists of, in order from the object side, a positive lens element and a negative lens element,
said fourth lens unit comprises spherical lens elements,
said fifth lens unit comprises a single negative meniscus lens component which has a concave surface on the image side, and
a moving amount of said second lens unit is larger than moving amounts of other said lens units when magnification is changed from a wide position to a tele position.

4. A zoom lens system according to claim 1 or 2 wherein said first lens unit is kept stationary during the change of magnification.

5. A zoom lens system according to claim 1 or 2 wherein said third lens unit is kept stationary during the change of magnification.

6. A zoom lens system according to claim 1 or 2 wherein said fifth lens unit is kept stationary during the change of magnification.

7. A zoom lens system according to claim 1 or 2, wherein said third lens unit comprises at least one positive lens element and at least one negative lens element.

8. A zoom lens system according to claim 1 or 2, wherein said fifth lens unit comprises a single negative meniscus lens component which has a concave surface on an image side.

9. A zoom lens system according to claim 1 or 2 wherein said third lens unit comprises at least one lens element which has at least one aspherical surface.

10. A zoom lens system according to claim 1 or 2 wherein said fifth lens unit comprises at least one lens element which has at least one aspherical surface.

11. A zoom lens system according to claim 1 or 2 wherein each of said third lens unit and said fifth lens unit comprises at least one lens element which has at least one aspherical surface.

12. A zoom lens system according to claim 2 satisfying condition (1):

$$-0.85 < f_w/f_2 < -0.25 \qquad (1)$$

wherein reference symbol $f_w$ represents a focal length of the zoom lens system as a whole at a wide position and reference symbol $f_2$ designates a focal length of said second lens unit.

13. A zoom lens system according to claim 1 or 2, wherein said third lens unit comprises a positive lens element and a negative lens element, and wherein said zoom lens system satisfies condition (2):

$$\nu_P/\nu_n > 1.1 \qquad (2)$$

wherein reference symbol $\nu_P$ represents an Abbe's number of the positive lens element in the third lens unit and reference symbol $\nu_n$ designates an Abbe's number of the negative lens element in the third lens unit.

14. A zoom lens system according to claim 1 or 2 satisfying condition (1-1):

$$-0.65 < f_w/f_2 < -0.35 \qquad (1-1)$$

wherein reference symbol $f_w$ represents a focal length of the zoom lens system as a whole at a wide position and reference symbol $f_2$ designates a focal length of said second lens unit.

15. A zoom lens system according to claim 1 or 2, wherein said third lens unit comprises a positive lens element and a negative lens element, and wherein said zoom lens system satisfies condition (2-1):

$$\nu_P/\nu_n > 1.3 \qquad (2-1)$$

wherein reference symbol $\nu_P$ represents an Abbe's number of the positive lens element in the third lens unit and reference symbol $\nu_n$ designates an Abbe's number of the negative lens element in the third lens unit.

16. A zoom lens system according to claim 1 or 2 satisfying condition (3-1):

$$0.07 < f_w/f_1 < 0.16 \qquad (3-1)$$

wherein reference symbol $f_w$ represents a focal length of said zoom lens system as a whole at a wide position and reference symbol $f_1$ designates a focal length of said first lens unit.

17. A zoom lens system according to claim 1 or 2 satisfying condition (4):

$$0.08 < f_w/f_3 < 0.2 \qquad (4)$$

wherein reference symbol $f_3$ represents a focal length of the third lens unit and reference symbol $f_w$ designates a focal length of the zoom lens system as a whole at a wide position.

18. A zoom lens system according to claim 1 or 2 satisfying condition (5):

$$3.2 < f_t/f_4 < 5.0 \qquad (5)$$

wherein reference symbol $f_4$ represents a focal length of the fourth lens unit and reference symbol $f_t$ designates a focal length of the zoom lens system as a whole at the tele position.

19. A zoom lens system according to claim 1 or 2 satisfying condition (6):

$$-5.0 < f_t/f_5 < -1.0 \qquad (6)$$

wherein reference symbol $f_5$ represents a focal length of the fifth lens unit and reference symbol $f_t$ designates a focal length of the zoom lens system as a whole at the tele position.

20. A zoom lens system according to claim 9, wherein said aspherical surface has a shape which weakens a positive refractive power or strengthens a negative refractive power as portions of said aspherical surface are farther from the optical axis toward a marginal portion of said aspherical surface.

21. A zoom lens system according to claim 10, wherein said aspherical surface has a shape which weakens a positive refractive power or strengthens a negative refractive power as portions of said aspherical surface are farther from the optical axis toward a marginal portion of said aspherical surface.

22. A zoom lens system according to claim 11, wherein at least one of said aspherical surfaces have a shape which weakens a positive refractive power or strengthens a negative refractive power as portions of said aspherical surface are farther from the optical axis toward a marginal portion of said aspherical surface.

23. A zoom lens system according to claim 1 or 2, wherein said second lens unit consists of homogenous spherical lens elements.

24. A zoom lens system according to claim 1 or 2 wherein said third lens unit comprises a cemented lens component.

25. A zoom lens system according to claim 1 or 2 wherein said fourth lens unit is moved along the optical axis for focusing said zoom lens system.

26. An image pickup apparatus comprising the zoom lens system according to claim 1 or 2.

27. A zoom lens system according to claim 1 or 2, wherein said third lens unit consists of, in order from the object side, a positive lens element and a negative lens element.

28. A zoom lens system according to claim 1, 2, or 3, wherein said fourth lens unit comprises a cemented lens component.

29. A zoom lens system according to claim 3, wherein said first lens unit is kept stationary during the change of magnification.

30. A zoom lens system according to claim 3, wherein said third lens unit is kept stationary during the change of magnification.

31. A zoom lens system according to claim 3, wherein said fifth lens unit is kept stationary during the change of magnification.

32. A zoom lens system according to claim 3, wherein said third lens unit comprises at least one lens element which has at least one aspherical surface.

33. A zoom lens system according to claim 3, wherein said fifth lens unit comprises at least one lens element which has at least one aspherical surface.

34. A zoom lens system according to claim 3, wherein each of said third lens unit and said fifth lens unit comprises at least one lens element which has at least one aspherical surface.

35. A zoom lens system according to claim 3, satisfying condition (2):

$$\nu_P/\nu_n > 1.1 \qquad (2)$$

wherein reference symbol $\nu_P$ represents an Abbe's number of the positive lens element in the third lens unit and reference symbol $\upsilon_n$ designates an Abbe's number of the negative lens element in the third lens unit.

36. A zoom lens system according to claim 3, satisfying condition (2-1):

$$\upsilon_P/\upsilon_n > 1.3 \tag{2-1}$$

wherein the reference symbol $\upsilon_P$ represents an Abbe's number of the positive lens element used in the third lens unit and the reference symbol $\upsilon_n$ designates an Abbe's number of the negative lens element used in the third lens unit.

37. A zoom lens system according to claim 22, wherein said aspherical surface has a shape which weakens a positive refractive power or strengthens a negative refractive power as portions of said aspherical surface are farther from the optical axis toward a marginal portion of said aspherical surface.

38. A zoom lens system according to claim 33, wherein said aspherical surface has a shape which weakens a positive refractive power or strengthens a negative refractive power as portions of said aspherical surface are farther from the optical axis toward a marginal portion of said aspherical surface.

39. A zoom lens system according to claim 34, wherein at least one of said aspherical surfaces have a shape which weakens a positive refractive power or strengthens a negative refractive power as portions of said aspherical surface are farther from the optical axis toward a marginal portion of said aspherical surfaces.

40. A zoom lens system according to claim 3, wherein said second lens unit consists of homogeneous spherical lens elements.

41. A zoom lens system according to claim 3, wherein said third lens unit comprises a cemented lens component.

42. A zoom lens system according to claim 3, wherein said fourth lens unit is moved along the optical axis for focusing said zoom lens system.

43. An image pickup apparatus comprising the zoom lens system according to claim 3.

44. A zoom lens system comprising, in order from an object side:

a first lens unit having a positive refractive power;

a second lens unit which has a negative refractive power and is moved along an optical axis effecting a change in magnification;

a third lens unit having a positive refractive power;

a fourth lens unit which has a positive refractive power and is moved along the optical axis for correcting a deviation of a focal point caused by changing the magnification; and a fifth lens unit having a negative refractive power, wherein said third lens unit comprises at least one positive lens element and at least one negative lens element, said fourth lens unit comprises spherical lens elements, said fifth lens unit comprises a single negative meniscus lens component which has a concave surface on the image side, and satisfying condition (1):

$$-0.85 < f_w/f_2 < -0.25 \tag{1}$$

wherein reference symbol $f_w$ represents a focal length of the zoom lens system as a whole at a wide position and reference symbol $f_2$ designates a focal length of said second lens unit.

45. A zoom lens system comprising, in order from an object side:

a first lens unit having a positive refractive power;

a second lens unit which has a negative refractive power and is moved along an optical axis effecting a change in magnification;

a third lens unit having a positive refractive power;

a fourth lens unit which has a positive refractive power and is moved along the optical axis for correcting a deviation of a focal point caused by changing the magnification; and a fifth lens unit having a negative refractive power, wherein said third lens unit comprises at least one positive lens element and at least one negative lens element, said fourth lens unit comprises spherical lens elements, said fifth lens unit comprises a single negative meniscus lens component which has a concave surface on the image side, and satisfying condition (3):

$$0.05 < f_w/f_1 < 0.22 \tag{3}$$

wherein reference symbol $f_w$ represents a focal length of said zoom lens system as a whole at a wide position and reference symbol $f_1$ designates a focal length of said first lens unit.

46. A zoom lens system comprising, in order from an object side:

a first lens unit having a positive refractive power;

a second lens unit which has a negative refractive power and is moved along an optical axis effecting a change in magnification;

a third lens unit having a positive refractive power;

a fourth lens unit which has a positive refractive power and is moved along the optical axis for correcting a deviation of a focal point caused by changing the magnification; and a fifth lens unit having a negative refractive power, wherein said third lens unit comprises at least one positive lens element and at least one negative lens element, said fourth lens unit comprises spherical lens elements, said fifth lens unit comprises a single negative meniscus lens component which has a concave surface on the image side, and satisfying condition (1-1):

$$-0.65 < f_w/f_2 < -0.35 \tag{1-1}$$

wherein reference symbol $f_w$ represents a focal length of the zoom lens system as a whole at a wide position and reference symbol $f_2$ designates a focal length of said second lens unit.

47. A zoom lens system comprising, in order from an object side:

a first lens unit having a positive refractive power;

a second lens unit which has a negative refractive power and is moved along an optical axis effecting a change in magnification;

a third lens unit having a positive refractive power;

a fourth lens unit which has a positive refractive power and is moved along the optical axis for correcting a deviation of a focal point caused by changing the magnification; and a fifth lens unit having a negative refractive power, wherein said third lens unit comprises at least one positive lens element and at least one negative lens element, said fourth lens unit comprises spherical lens elements, said fifth lens unit comprises a single negative meniscus lens component which has a concave surface on the image side, and satisfying condition (3-1):

$$0.07 < f_w/f_1 < 0.16 \tag{3-1}$$

wherein reference symbol $f_w$ represents a focal length of said zoom lens system as a whole at a wide position and reference symbol $f_1$ designates a focal length of said first lens unit.

48. A zoom lens system comprising, in order from an object side:

a first lens unit having a positive refractive power;

a second lens unit which has a negative refractive power and is moved along an optical axis effecting a change in magnification;

a third lens unit having a positive refractive power;

a fourth lens unit which has a positive refractive power and is moved along the optical axis for correcting a deviation of a focal point caused by changing the magnification; and a fifth lens unit having a negative refractive power, wherein said third lens unit comprises at least one positive lens element and at least one negative lens element, said fourth lens unit comprises spherical lens elements, said fifth lens unit comprises a single negative meniscus lens component which has a concave surface on the image side, and satisfying condition (4):

$$0.08 < f_w/f_3 < 0.2 \tag{4}$$

wherein reference symbol $f_3$ represents a focal length of the third lens unit and reference symbol $f_w$ designates a focal length of the zoom lens system as a whole at a wide position.

49. A zoom lens system comprising, in order from an object side:

a first lens unit having a positive refractive power;

a second lens unit which has a negative refractive power and is moved along an optical axis effecting a change in magnification;

a third lens unit having a positive refractive power;

a fourth lens unit which has a positive refractive power and is moved along the optical axis for correcting a deviation of a focal point caused by changing the magnification; and a fifth lens unit having a negative refractive power, wherein said third lens unit comprises at least one positive lens element and at least one negative lens element, said fourth lens unit comprises spherical lens elements, said fifth lens unit comprises a single negative meniscus lens component which has a concave surface on the image side, and satisfying condition (5):

$$3.2 < f_t/f_4 < 5.0 \tag{5}$$

wherein reference symbol $f_4$ represents a focal length of the fourth lens unit and reference symbol $f_t$ designates a focal length of the zoom lens system as a whole at the tele position.

50. A zoom lens system comprising, in order from an object side:

a first lens unit having a positive refractive power;

a second lens unit which has a negative refractive power and is moved along an optical axis effecting a change in magnification;

a third lens unit having a positive refractive power;

a fourth lens unit which has a positive refractive power and is moved along the optical axis for correcting a deviation of a focal point caused by changing the magnification; and a fifth lens unit having a negative refractive power, wherein said third lens unit comprises at least one positive lens element and at least one negative lens element, said fourth lens unit comprises spherical lens elements, said fifth lens unit comprises a single negative meniscus lens component which has a concave surface on the image side, and satisfying condition (6):

$$-5.0 < f_t/f_5 < -1.0 \tag{6}$$

wherein reference symbol $f_5$ represents a focal length of the fifth lens unit and reference symbol $f_t$ designates a focal length of the zoom lens system as a whole at the tele position.

* * * * *